UNITED STATES PATENT OFFICE.

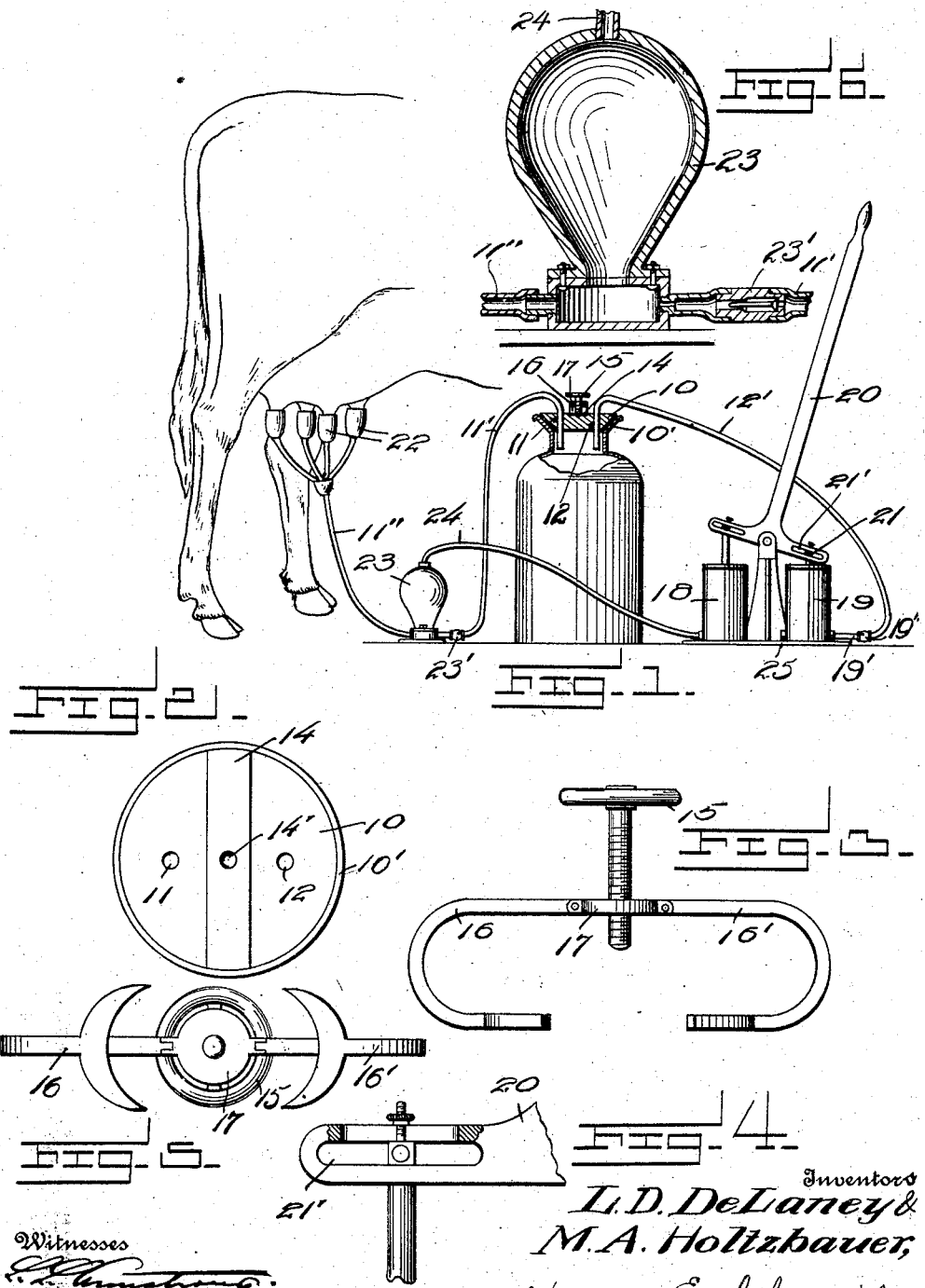

LEO D. DE LANEY AND MATHIAS A. HOLTZBAUER, OF BELMOND, IOWA.

MILKING-MACHINE.

1,021,578. Specification of Letters Patent. Patented Mar. 26, 1912.

Application filed December 22, 1910. Serial No. 598,857.

*To all whom it may concern:*

Be it known that we, LEO D. DE LANEY and MATHIAS A. HOLTZBAUER, citizens of the United States, residing at Belmond, in the county of Wright and State of Iowa, have invented certain new and useful Improvements in Milking-Machines, of which the following is a specification.

This invention relates to an improvement in milking machines.

The primary object of this invention is to provide a machine of this character which will be simple in construction, efficient in practice and economical to manufacture.

Other objects and advantages will be apparent from the following description, and it will be understood that changes in the specific structure shown and described may be made within the scope of the claims without departing from the spirit of the invention.

In the drawings: Figure 1 is a view partly in section of the device in its applied position, Fig. 2 a detail view of the can cover, Fig. 3 a detail view of the member adapted to hold said cover on the can, and, Fig. 4 a detail view of the pump cylinders. Fig. 5 is a bottom plan view of the device shown in Fig. 3. Fig. 6 is a sectional view of the vacuum chamber.

In the drawings: 10 designates a cover which is adapted to fit within the common type of milk can, a gasket 10' assuring an air tight fit. This cover is provided with apertures 11 and 12, through which extend tubes 11' and 12'. A metallic plate 14 extends transversely across the cover, said plate being provided with a central depression 14' which receives the end portion of a screw 15 of a cover tightening device, this cover tightening device consists of the members 16 and 16' which are hingedly connected to a nut 17 through which the screw 15 passes, the end portions of the member 16 being adapted to grasp the can, as the screw 15 is forced in engagement with the cover. The provision of the hinged connections of the members 16 and 16' makes the easy application and removal of the tightening device from the can. Were the members 16 and 16' rigidly attached to the nut 17, it would be necessary to loosen the screw 15 to a greater extent than in the present case, to release the device from the can. When in operative position, the device assumes the position shown in dotted lines in Fig. 3. It will thus be seen that to release the device the screw 15 is loosened slightly, when one or both of the members 16 and 16' may be swung outwardly and upwardly.

A plurality of vacuum pumps 18 and 19 are positioned upon a suitable support which may be conveniently moved. These pumps are actuated by means of the lever 20, the pistons of said pumps being secured to blocks 21 which are adjustably arranged within grooves 21' formed within the lever 20, this adjustment permitting the regulation of the stroke. The vacuum chamber 19 is connected by means of the tube 19' with the tube 12', thus creating a vacuum within the milk receptacle, a suitable check valve 19'' being arranged in the tube 19' to prevent back pressure. The tube 11' carried by the cover is connected to a chamber 23 which is connected to a series of teat cups 22 by means of a tube 11'' which cups are placed on the teats of the animal to be milked. The chamber 23 is arranged at a point adjacent the cover, a check valve 23' being arranged in the tube 11' between said chamber and said cover. A tube 24 connects the chamber 23 with the cylinder 18, said cylinder creating a vacuum in said chamber, drawing the milk through tube 11'' into said chamber, the milk being then drawn from said chamber by the vacuum which has been created in the milk receptacle by means of the cylinder 19.

In the position shown in Fig. 1 the chamber 18 has created a vacuum in the chamber 23 by means of the pipe 24, which vacuum is filled with milk from the cups 22, and upon moving the lever 20 to the left the chamber 19 will create a vacuum in the can through the pipe 12' which will suck the milk from the chamber 23 through the check valve 23' and the pipe 11'' into the can. At the same time the piston of the chamber 18 descends, relieving the vacuum in the chamber 23, and permitting the air in the pipe 24 to pass back toward said chamber. It will thus be seen that a movement to the right, of the lever 20 creates a vacuum in the chamber 23 to draw milk from the cow while a movement of the lever in the opposite direction creates a vacuum in the can to draw the milk from the chamber 23, making a series of alternate formations of vacuum in the chamber 23 and in the can. The check valve 19'' prevents any back pressure in the can, while the check valve 23' prevents any back pressure of the milk toward the cow. The valve 25 permits the air in the cylinder 19 to exhaust at every down stroke, as during such stroke the valve 19'' is closed.

It will be seen from the foregoing that a machine constructed in this manner will effectually draw the milk from the animal and conduct the same to the milk receptacle without there being any danger of back pressure which would tend to disengage the teat cups. Attention is also called to the fact that when one can has been filled, the pressure may be cut off and the cover positioned on another can, the clamping means heretofore described facilitating the ready positioning of the cover.

What is claimed is:

1. A milking device consisting of a cover adapted to rest within the opening in a milk receptacle, a plate arranged transversely on said cover, a nut, a screw passing centrally through said nut, a plurality of retaining members hingedly connected to said nut, said retaining members being adapted to contact with the flange of the receptacle, a plurality of tubes extending through said cover, pump cylinders, one of said tubes being connected to one of the pump cylinders which is adapted to create a vacuum within the milk receptacle, a series of teat cups the second tube being connected to said series of teat cups, a chamber arranged on said tube, said chamber being connected to the other of said pump cylinders whereby a vacuum is created in said chamber.

2. A milking machine consisting of a cover adapted to form a closure for a milk receptacle, means for securing said cover to said receptacle, tubes extending through said cover, means connected to one of said tubes for creating a vacuum in said receptacle, a suction chamber, the other of the tubes connecting said receptacle with the suction chamber, a tube connecting the chamber with the milk supply, a second vacuum creating means, and connections between the said chamber and the second vacuum creating means.

3. The combination with a milk receptacle and a plurality of teat cups, of a pair of vacuum pumps, a vacuum chamber, connections between the teat cups and the vacuum chamber, connections between the vacuum chamber and the receptacle, connections between the vacuum chamber and one of said vacuum pumps, connections between the receptacle and the other of said vacuum pumps, and means for operating said pumps, whereby a vacuum is created alternately in the receptacle and in the vacuum chamber.

In testimony whereof we affix our signatures, in presence of two witnesses.

LEO D. DE LANEY.
MATHIAS A. HOLTZBAUER.

Witnesses:
JNO. BERG,
EARL MADSEN.